(12) United States Patent
Hoek et al.

(10) Patent No.: US 9,884,591 B2
(45) Date of Patent: Feb. 6, 2018

(54) DISPLAY SYSTEM FOR DISPLAYING IMAGES ACQUIRED BY A CAMERA SYSTEM ONTO A REARVIEW ASSEMBLY OF A VEHICLE

(71) Applicant: Gentex Corporation, Zeeland, MI (US)

(72) Inventors: Steven G. Hoek, Holland, MI (US); Ethan J. Lee, Byron Center, MI (US)

(73) Assignee: GENTEX CORPORATION, Zeeland, MI (US)

( * ) Notice: Subject to any disclaimer, the term of this patent is extended or adjusted under 35 U.S.C. 154(b) by 347 days.

(21) Appl. No.: 14/472,696

(22) Filed: Aug. 29, 2014

(65) Prior Publication Data

US 2015/0062342 A1 Mar. 5, 2015

Related U.S. Application Data

(60) Provisional application No. 61/873,469, filed on Sep. 4, 2013.

(51) Int. Cl.
*H04N 9/47* (2006.01)
*H04N 7/18* (2006.01)
(Continued)

(52) U.S. Cl.
CPC .................. *B60R 1/04* (2013.01); *B60R 1/12* (2013.01); *B60R 2001/1253* (2013.01); *H04N 7/183* (2013.01)

(58) Field of Classification Search
CPC ..... B60R 1/04; B60R 1/12; B60R 2001/1253; B60R 1/02; H04N 7/183
(Continued)

(56) References Cited

U.S. PATENT DOCUMENTS 5,105,127 A 4/1992 Lavaued et al.
5,285,060 A 2/1994 Larson et al.
(Continued)

FOREIGN PATENT DOCUMENTS

CN 101883214 11/2010
CN 202903330 4/2013
(Continued)

OTHER PUBLICATIONS

Patent Cooperation Treaty, International Searching Authority, International Search Report, Written Opinion of the International Searching Authority and Notification of Transmittal, Feb. 19, 2015, 7 Pages.

(Continued)

*Primary Examiner* — Jared Walker
(74) *Attorney, Agent, or Firm* — Price Heneveld LLP; Bradley D. Johnson

(57) ABSTRACT

A display system for use in a controlled vehicle is provided, and includes a rearview assembly having a display device located behind a mirror element, a camera system configured to acquire images of a scene external of the controlled vehicle, and a processing system configured to receive a signal representative of the acquired images and to produce an image of the scene on the display device of the rearview assembly, wherein the processing system is further configured to adjust the photosensitivity of the camera system based on an input from at least one of an ambient light sensor and a direct glare sensor.

20 Claims, 1 Drawing Sheet

(51) Int. Cl.
*B60R 1/04* (2006.01)
*B60R 1/12* (2006.01)

(58) Field of Classification Search
USPC ........................................................ 348/148
See application file for complete search history.

(56) References Cited

U.S. PATENT DOCUMENTS

| | | | |
|---|---|---|---|
| 5,289,321 A | 2/1994 | Secor | |
| 5,574,443 A | 12/1996 | Hsieh | |
| 5,754,159 A | 5/1998 | Wood et al. | |
| 5,837,994 A | 11/1998 | Stam et al. | |
| 5,990,469 A | 11/1999 | Bechtel et al. | |
| 6,008,486 A | 12/1999 | Stam et al. | |
| 6,049,171 A | 4/2000 | Stam et al. | |
| 6,130,421 A | 10/2000 | Bechtel et al. | |
| 6,130,448 A | 10/2000 | Bauer et al. | |
| 6,166,698 A | 12/2000 | Turnbull et al. | |
| 6,222,457 B1 | 4/2001 | Mills et al. | |
| 6,356,376 B1 | 3/2002 | Tonar et al. | |
| 6,379,013 B1 | 4/2002 | Bechtel et al. | |
| 6,403,942 B1 | 6/2002 | Stam | |
| 6,550,949 B1 | 4/2003 | Bauer et al. | |
| 6,587,573 B1 | 7/2003 | Stam et al. | |
| 6,611,610 B1 | 8/2003 | Stam et al. | |
| 6,631,316 B2 | 10/2003 | Stam et al. | |
| 6,690,268 B2 | 2/2004 | Schofield et al. | |
| 6,700,692 B2 | 3/2004 | Tonar et al. | |
| 6,774,988 B2 | 8/2004 | Stam et al. | |
| 6,861,809 B2 | 3/2005 | Stam | |
| 6,864,930 B2 | 3/2005 | Matsushita et al. | |
| 7,286,193 B2 | 10/2007 | Yoo et al. | |
| 7,321,112 B2 | 1/2008 | Stam et al. | |
| 7,324,261 B2 | 1/2008 | Tonar et al. | |
| 7,329,850 B2 | 2/2008 | Drummond et al. | |
| 7,370,983 B2 | 5/2008 | DeWind et al. | |
| 7,372,611 B2 | 5/2008 | Tonar et al. | |
| 7,417,221 B2 | 8/2008 | Creswick et al. | |
| 7,488,080 B2 | 2/2009 | Skiver et al. | |
| 7,490,007 B2 | 2/2009 | Taylor et al. | |
| 7,502,156 B2 | 3/2009 | Tonar et al. | |
| 7,505,047 B2 | 3/2009 | Yoshimura | |
| 7,540,620 B2 | 6/2009 | Weller et al. | |
| 7,565,006 B2 | 7/2009 | Stam et al. | |
| 7,567,291 B2 | 7/2009 | Bechtel et al. | |
| 7,586,666 B2 | 9/2009 | McCabe et al. | |
| 7,597,469 B2 | 10/2009 | Nishigaki | |
| 7,619,508 B2 | 11/2009 | Lynam et al. | |
| 7,653,215 B2 | 1/2010 | Stam | |
| 7,667,579 B2 | 2/2010 | DeLine et al. | |
| 7,683,326 B2 | 3/2010 | Stam et al. | |
| 7,683,768 B2 | 3/2010 | Lindahl et al. | |
| 7,726,822 B2 | 6/2010 | Blank et al. | |
| 7,734,392 B2 | 6/2010 | Schofield et al. | |
| 7,771,061 B2 | 8/2010 | Varaprasad et al. | |
| 7,777,611 B2 | 8/2010 | Desai | |
| 7,826,123 B2 | 11/2010 | McCabe et al. | |
| 7,855,755 B2 | 12/2010 | Weller et al. | |
| 7,864,136 B2 | 1/2011 | Mathies et al. | |
| 7,881,839 B2 | 2/2011 | Stam et al. | |
| 8,004,741 B2 | 8/2011 | Tonar et al. | |
| 8,045,760 B2 | 10/2011 | Stam et al. | |
| 8,120,652 B2 | 2/2012 | Bechtel et al. | |
| 8,169,684 B2 | 5/2012 | Bugno et al. | |
| 8,237,909 B2 | 8/2012 | Ostreko et al. | |
| 8,339,526 B2 | 12/2012 | Minikey, Jr. et al. | |
| 8,465,162 B2 | 6/2013 | Weller et al. | |
| 2001/0035853 A1 | 11/2001 | Hoelen et al. | |
| 2003/0043480 A1 | 3/2003 | Burgner | |
| 2008/0068520 A1 | 3/2008 | Minikey, Jr. et al. | |
| 2008/0192132 A1 | 8/2008 | Bechtel et al. | |
| 2008/0216567 A1 | 9/2008 | Breed | |
| 2008/0284929 A1 | 11/2008 | Kimura | |
| 2009/0096937 A1* | 4/2009 | Bauer ........................ | B60R 1/12 348/739 |
| 2010/0045899 A1 | 2/2010 | Ockerse | |
| 2010/0201816 A1* | 8/2010 | Lee ........................... | B60R 1/12 348/148 |
| 2011/0069043 A1 | 3/2011 | Lee et al. | |
| 2011/0249120 A1* | 10/2011 | Bingle ..................... | B60R 11/04 348/148 |
| 2011/0317242 A1 | 12/2011 | Tonar et al. | |
| 2012/0072080 A1 | 3/2012 | Jeromin et al. | |
| 2013/0028473 A1 | 1/2013 | Hilldore et al. | |

FOREIGN PATENT DOCUMENTS

| | | |
|---|---|---|
| EP | 0899157 A1 | 3/1999 |
| EP | 2378350 A1 | 10/2011 |
| JP | 7266928 | 10/1995 |
| JP | 11078693 | 3/1999 |
| JP | 2001024934 | 1/2001 |
| JP | 2003101997 | 4/2003 |
| JP | 2003209750 | 7/2003 |
| JP | 2009529452 A | 8/2009 |
| JP | 2012228931 | 11/2012 |
| KR | 101169017 | 7/2012 |
| WO | 2000057638 | 9/2000 |
| WO | 2009026223 A2 | 2/2009 |

OTHER PUBLICATIONS

Silviu Palalau et al., "FPD Evaluation for Automotive Application," Vehicle Displays, The Society for Information Display, 1995, pp. 97-103.
Phil Zuk et al., "Flat Panel Display Applications in Agriculture Equipment," Flat Panel & Vehicle Display '98, The Society for Information Display, 1998, pp. 125-130.
Meera Vijan et al., "A 1.7-Mpixel Full-Color Diode Driven AM-LCD," SID 90 Digest, The Society for Information Display, First Edition, May 1990, pp. 530-533.
Mark R. Vincen, "The Automotive Challenge to Active Matrix LCD Technology," Vehicle Displays '98, The Society for Information Display, 1996, pp. 17-21.
Kim M. Corsi et al., "Reconfigurable Displays Used as Primary Automotive Instrumentation," SAE Technical Paper Series, 890282, Feb. 1989, pp. 13-18.
Robert W. Schumacher, "Automotive Display Trends," SID 96 Digest, The Society for Information Display, 1997, pp. 1-6.
Peter M. Knoll, "The Use of Displays in Automotive Applications," Journal of the SID 5/3, The Society for Information Display, 1997, pp. 165-172, 315-316.
Robert L. Donofrio, "Looking Beyond the Dashboard," Information Display 7/02, The Society for Information Display, 2002, pp. 30-34.
Karl E. Stone, "Automotive Display Specifications," Vehicle Displays, The Society for Information Display, 1995, pp. 93-96.
Glenn J. Adler, "A New Automotive AMLCD Module," Vehicle Displays, The Society for Information Display, 1995, pp. 67-71.
Tina Brunetti Sayer et al., "In-Vehicle Displays for Crash Avoidance and Navigation Systems," Vehicle Displays '98, The Society for Information Display, 1996, pp. 39-42.
Peter M. Knoll et al., "Application of Graphic Displays in Automobiles," SID 87 Digest, 1987, pp. 41-44.
Toshiyuki Terada et al., "Development of Central Information Display of Automotive Application," SID 89 Digest, 1989, pp. 192-195.
S.V. Thomsen et al., "AMLCD Design Considerations for Avionics and Vetronics Applications," Flat Panel & Vehicle Display '98, The Society for Information Display, 1998, pp. 139-145.
Peter M. Knoll, et al., "Conception of an Integrated Driver Information System," SID 90 Digest, The Society for Information Display, First Edition, May 1990, pp. 126-129.
Mark R.Vincen, "An Analysis of Direct-View FPDs for Automotive Multi-Media Applications," Vehicle Displays & Microsensors' 99, the Society for Information Display, 1999, pp. 39-46.

* cited by examiner

DISPLAY SYSTEM FOR DISPLAYING IMAGES ACQUIRED BY A CAMERA SYSTEM ONTO A REARVIEW ASSEMBLY OF A VEHICLE

CROSS-REFERENCE TO RELATED APPLICATION

This application claims priority to and the benefit under 35 U.S.C. §119(e) of U.S. Provisional Patent Application No. 61/873,469, filed on Sep. 4, 2013, entitled "DISPLAY SYSTEM FOR DISPLAYING IMAGES ACQUIRED BY A CAMERA SYSTEM ONTO A REARVIEW ASSEMBLY OF A VEHICLE," the entire disclosure of which is hereby incorporated herein by reference.

FIELD OF THE INVENTION

The present invention generally relates to display systems and camera systems, and more specifically, to a display system for displaying images acquired by a camera system onto a rearview assembly of a vehicle.

SUMMARY OF THE INVENTION

According to one aspect of the present invention, a display system for use in a controlled vehicle is provided. The display system includes a rearview assembly having a display device located behind a mirror element. A camera system is configured to acquire images of a scene external of the controlled vehicle. A processing system is configured to receive a signal representative of the acquired images and to produce images of the scene on the display device of the rearview assembly, wherein the processing system is further configured to adjust the photosensitivity of the camera system based on an input from at least one of an ambient light sensor and a direct glare sensor.

According to another aspect of the present invention, a display system for displaying video images of a scene acquired by a camera system onto a rearview assembly of a vehicle is provided. The display system includes a display device positioned behind a mirror element of the rearview assembly. A processing system is configured to receive signals representative of the acquired video images and to produce images of the scene on the display device of the rearview assembly, wherein the processing system is further configured to adjust the integration time of the camera system based on an input from at least one of an ambient light sensor and a direct glare sensor.

According to another aspect of the present invention, a display system for use in a controlled vehicle is provided. The display system includes a rearview assembly having a display device located behind a mirror element. A camera system is configured to acquire video images of a scene external of the controlled vehicle. A processing system is configured to receive signals representative of the acquired video images and to produce images of the scene on the display device of the rearview assembly, wherein the processing system is further configured to generate a multiplexed signal that is used for adjusting the integration time of the camera system based on an input from at least one sensor.

These and other features, advantages, and objects of the present invention will be further understood and appreciated by those skilled in the art by reference to the following specification, claims, and appended drawings.

BRIEF DESCRIPTION OF THE DRAWINGS

The present invention will be more fully understood from the detailed description and the accompanying drawings, wherein.

DETAILED DESCRIPTION OF THE PREFERRED EMBODIMENTS

Figure 1:
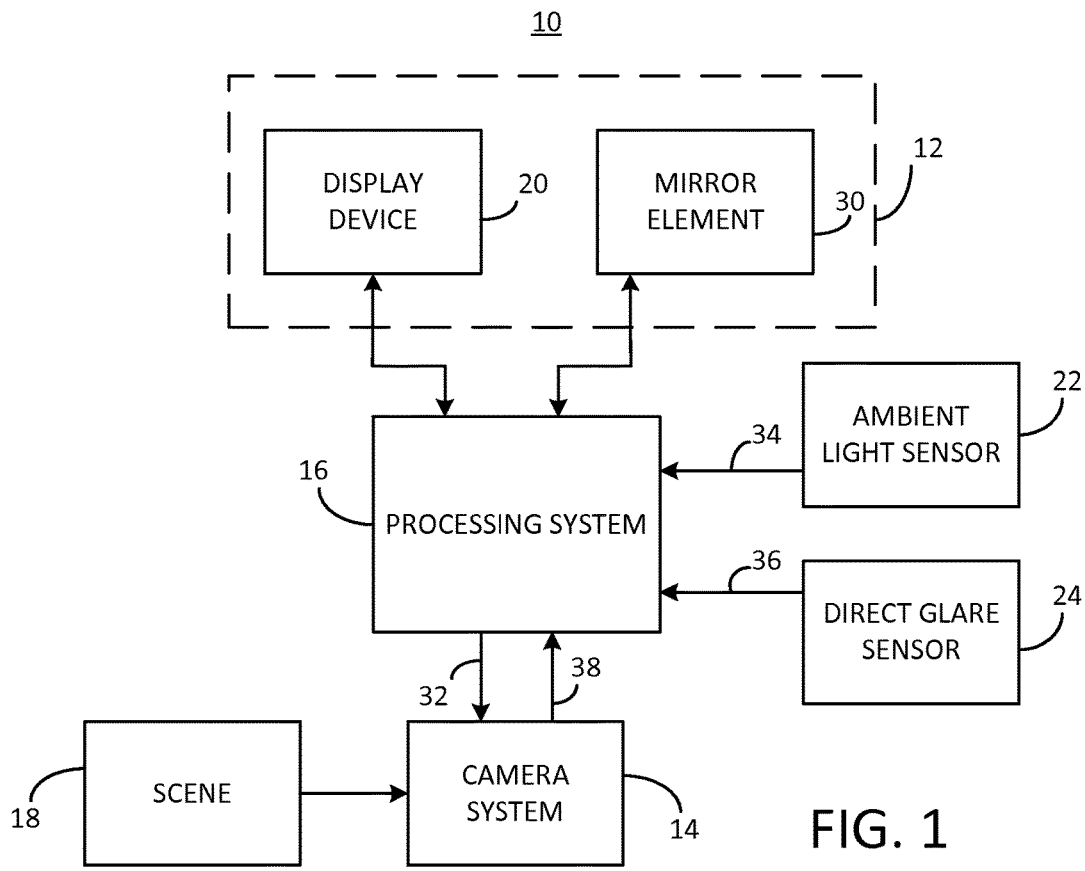
FIG. 1 is a block diagram of a display system of a controlled vehicle constructed according to an embodiment of the present invention.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The present invention generally relates to a display system for displaying video images of a scene acquired by a camera system onto a rearview assembly of a vehicle. FIG. 1 shows an example of a display system 10, which includes a rearview assembly 12, a camera system 14, and a processing system 16. In the example shown, signals representative of a scene 18 imaged by the camera system 14 are sent to the processing system 16, which produces images of the scene 18 on a display device 20 of the rearview assembly 12. The processing system 16 also receives input from an ambient light sensor 22 and a direct glare sensor 24 to adjust the photosensitivity of the camera system 14.

Figure 2:
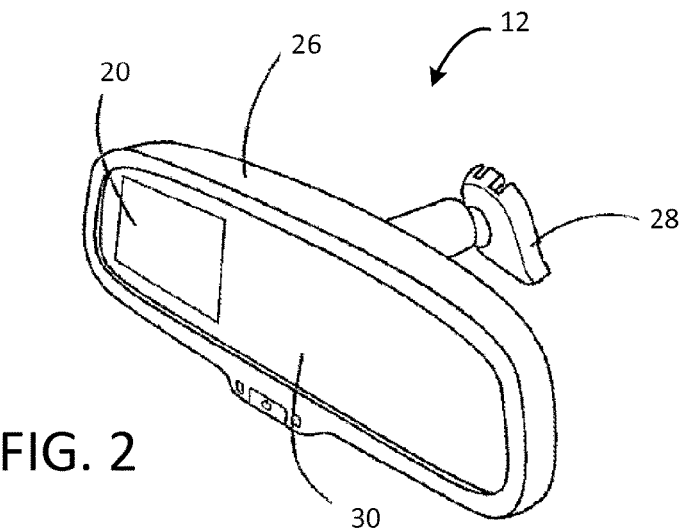
FIG. 2 is a side perspective view of a rearview assembly incorporating a display system according to the embodiment shown in FIG. 1.

The rearview assembly 12 is generally shown in FIG. 2 and includes a housing 26 and a mount 28 for mounting the housing 26 to the vehicle. The mount 28 may be of any conventional type such as the type for attaching the rearview assembly 12 to a windshield, roof, headliner, or overhead console of the vehicle. Rearview assembly 12 further includes a mirror element 30, which may be embodied as an electrochromic element, a prismatic mirror element, or other element used in the automotive industry. The mirror element 30 may include a partially reflective, partially transmissive coating to hide the display when not in use, as disclosed in U.S. Pat. Nos. 6,356,376 and 6,700,692, the entire disclosures of which are incorporated herein by reference. The display device 20 of the rearview assembly 12 may be positioned within the housing 26 and behind the mirror element 30. The display device 20 may be embodied as a liquid crystal display (LCD), a light emitting diode (LED) display, an organic LED (OLED) display, or other display suited for use inside a rearview assembly. While the display device 20 is shown positioned nearest to the driver side of the vehicle, it is to be understood that the display device 20 may be positioned anywhere behind the mirror element 30. In addition, the display device 20 may be of any shape or size and may constitute all or a portion of the area of the mirror element 30. Examples of rearview assemblies having display devices can be found in U.S. Pat. No. 8,339,526 and U.S. Patent Application Publication No. US20090096937 A1, the entire disclosures of which are incorporated herein by reference.

Referring back to FIG. 1, camera system 14 is operative to view scene 18. The camera system 14 may be any conventional camera system. Examples of suitable camera systems are disclosed in U.S. Patent Application Publication Nos. US 20080192132 A1 and US 20120072080 A1, and in U.S. Provisional Application Nos. 61/500,418 entitled "MEDIAN FILTER" filed on Jun. 23, 2011, by Jon H. Bechtel et al.; 61/544,315 entitled "MEDIAN FILTER" filed on Oct. 7, 2011, by Jon H. Bechtel et al.; and 61/556,864 entitled "HIGH DYNAMIC RANGE CAMERA LOW LIGHT LEVEL FILTERING" filed on Nov. 8, 2011, by Jon H. Bechtel et al., the entire disclosures of which are incorporated herein by reference.

In addition to providing images of scene 18 for display, the camera system 14 may also be used for other automotive applications such as exterior light control systems, lane departure warning systems, forward collision warning systems, adaptive cruise control systems, pedestrian detection systems, night vision systems, terrain detection systems, parking assist systems, traffic sign recognition systems, and reverse camera display systems. Examples of systems using camera systems for such purposes are disclosed in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, and in U.S. Provisional Application Nos. 61/512,213 entitled "RAISED LANE MARKER DETECTION SYSTEM AND METHOD THEREOF" filed on Jul. 27, 2011, by Brock R. Rycenga et al., and 61/512,158 entitled "COLLISION WARNING SYSTEM AND METHOD THEREOF" filed on Jul. 27, 2011, by Brock R. Rycenga et al., which together correspond to United States Patent Application Publication No. US20130028473 A1, the entire disclosures of which are incorporated herein by reference.

As will be obvious to one of ordinary skill in the art, the camera system 14 may be oriented in a variety of ways to view scenes at various locations about the vehicle. Thus, scene 18 may include, but is not limited to, the sides, back, front, bottom, top, and inside of the vehicle. Further, the camera system 14 may be mounted in a variety of locations such as, but not limited to, a tail light(s) or a center high-mounted stop light (CHMSL) assembly, or provided as an integral component such as, but not limited to, behind a rear window as disclosed in U.S. Pat. No. 6,550,949 or inside a rearview assembly as disclosed in U.S. Pat. No. 6,611,610, the entire disclosures of which are incorporated herein by reference.

In the example shown in FIG. 1, the processing system 16 may be wholly or partially incorporated with the camera system 14 or the display device 20, split amongst the camera system 14 and the display device 20, or provided separate from the camera system 14 and the display device 20. The processing system 16 is configured to receive at least one NTSC (National Television Standards Committee) analog video signal 32 from the camera system 14 and display the content on the display device 20 of the rearview assembly 12. As previously mentioned, the processing system 16 is also configured to receive input from the ambient light sensor 22 and the direct glare sensor 24 to control the photosensitivity of the camera system 14. For example, the processing system 16 may use an ambient light signal 34 from the ambient light sensor 22 to determine whether to place the camera system 14 in a day mode or a night mode setting, wherein the day mode setting includes one or more integration times that enable the camera system 14 to operate in high ambient light conditions, and the night mode includes one or more integration times that enable the camera system 14 to operate in low ambient light conditions.

As is known to those having ordinary skill in the art, the ambient light sensor 22 may be positioned in a variety of locations. For example, the ambient light sensor 22 may be a forward facing light sensor, such as the one described in U.S. Pat. No. 4,917,477, the entire disclosure of which is incorporated herein by reference.

In some instances, video images acquired by the camera system 14 may become saturated when the camera system 14 is operating in night mode and is subsequently exposed to light levels in excess of prevailing ambient light conditions. For example, when driving at night, the bright headlights of vehicles approaching from the rear may cause a rearward facing camera system to be exposed to an excess of light and may also cause excessive glare on the rearview assembly 12. In this scenario, ambient light levels may not necessarily change, and as such, the processing system 16 may be unable to remedy the situation by relying solely on the ambient light sensor 22. Instead, the processing system 16 may rely on the direct glare sensor 24, which may be placed in the rearview assembly 12 so as to sense light levels falling on the mirror element 30 and/or display device 20. The direct glare sensor 24 subsequently sends a direct glare signal 36 to the processing system 16. In response to excessive light levels, the processing system 16 signals to the camera system 14 to either adjust the integration time within the night mode setting or switch to a day mode setting altogether if needed to prevent image saturation.

In view of the above, it should be appreciated that the settings derived from the light levels sensed by ambient light sensor 22 and/or the direct glare sensor 24 may be used in place of or to supplement any existing photosensitivity settings of the camera system 14. Based on the ambient light and direct glare conditions detected by the ambient light and direct glare sensors 22 and 24, respectively, the processing system 16 sends a control signal 38 to the camera system 14 to operate in the appropriate mode. The control signal 38 may be sent to the camera system 14 as a separate signal or as a multiplexed signal over existing NTSC signals 32 between the processing system 16 and the camera system 14.

While the processing system 16 has been shown herein to receive input from ambient light and direct glare sensors 22 and 24, respectively, it is to be understood that the processing system 16 may receive input from other devices that are not shown herein such as, but not limited to, rain sensor(s), light sensor(s), automatic vehicle exterior light controller(s), microphone(s), global positioning systems, telecommunication systems, operator interface(s), and a host of other devices, and control the display device 20 to provide appropriate visual notifications and/or automatically manipulate other devices and systems.

Accordingly, a display system for displaying images acquired by a camera system onto a rearview assembly of a vehicle has been advantageously described herein. The display system 10 enables the photosensitivity of the camera system 14 to be adjusted based on inputs from at least one sensor that is presently employed in vehicles.

Although the above embodiments have been described as accounting for variances in scene brightness by adjusting the photosensitivity of the camera system, additional measures may be taken by adjusting the brightness of the display device 20 as disclosed in U.S. Pat. Nos. 6,550,949 and 7,567,291, and/or by adjusting the reflectivity of the electrochromic mirror element 30 as disclosed in U.S. Pat. No. 6,700,692, the entire disclosures of which are incorporated herein by reference.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A display system for use in a controlled vehicle, comprising:
   a rearview assembly having a display device located behind a mirror element;
   a camera system configured to acquire images of a rearward scene external of the controlled vehicle; and
   a processing system configured to receive a signal representative of the acquired images and to produce images of the scene on the display device of the rearview assembly, wherein the processing system is further configured to adjust the photosensitivity of the camera system based on inputs from both a forward-facing ambient light sensor and a rearward-facing direct glare sensor.

2. The display system of claim 1, wherein the display device comprises a liquid crystal display.

3. The display system of claim 1, wherein the mirror element is an electrochromic mirror.

4. The display system of claim 3, wherein the processing system is further configured to control a reflectivity of the electrochromic mirror element based on an input from at least one of the ambient light sensor and the direct glare sensor.

5. The display system of claim 1, wherein the processing system is further configured to adjust the photosensitivity of the camera system for either a day mode or a night mode based the input from the ambient light sensor and to temporarily change the photosensitivity of the camera system from a night mode to a day mode based on the input from the direct glare sensor.

6. The display system of claim 1, wherein the processing system is disposed in the rearview assembly.

7. The display system of claim 1, wherein the processing system is further configured to generate a multiplexed signal that is used to adjust the photosensitivity of the camera system.

8. The display system of claim 1, wherein the processing system is further configured to adjust the photosensitivity of the camera system by adjusting the integration time of the camera system.

9. The display system of claim 8, wherein the processing system is further configured to generate a multiplexed signal that is used to adjust the integration time of the camera system.

10. A display system for displaying video images of a scene acquired by a camera system onto a rearview assembly of a vehicle, the display system comprising:
    a display device positioned behind a mirror element of the rearview assembly; and
    a processing system configured to receive signals representative of the acquired video images and to produce images of the scene on the display device of the rearview assembly, wherein the processing system is further configured to adjust the integration time of the camera system based on inputs from both an ambient light sensor and a direct glare sensor, where the direct glare sensor senses light from the same direction as the camera system acquires the video images of the scene and the ambient light sensor senses light from the opposite direction of the direct glare sensor.

11. The display system of claim 10, wherein the display device comprises a liquid crystal display.

12. The display system of claim 10, wherein the processing system is further configured to adjust the photosensitivity of the camera system based on inputs from both the ambient light sensor and the direct glare sensor.

13. The display system of claim 10, wherein the processing system is further configured to generate a multiplexed signal that is used to adjust the integration time of the camera system.

14. A display system for use in a controlled vehicle, comprising:
    a rearview assembly having a display device located behind a mirror element;
    a camera system configured to acquire video images of a scene external of the controlled vehicle; and
    a processing system configured to receive signals representative of the acquired video images to produce images of the scene on the display device of the rearview assembly, wherein the processing system is further configured to generate a multiplexed signal that is used to adjust the integration time of the camera system based on inputs from two light sensors that capture light from opposite directions.

15. The display system of claim 14, wherein the display device comprises a liquid crystal display.

16. The display system of claim 14, wherein the mirror element is an electrochromic mirror.

17. The display system of claim 16, wherein the processing system is further configured to control a reflectivity of the electrochromic mirror element based on an input from at least one of the two light sensors.

18. The display system of claim 14, wherein the two light sensors include an ambient light sensor and a direct glare sensor.

19. The display system of claim 18, wherein the processing system is further configured to adjust the photosensitivity of the camera system for either a day mode or a night mode based on the input from the ambient light sensor and to temporarily change the photosensitivity of the camera system from a night mode to a day mode based on the input from the direct glare sensor.

20. The display system of claim 14, wherein the processing system is disposed in the rearview assembly.

* * * * *